Patented July 11, 1939

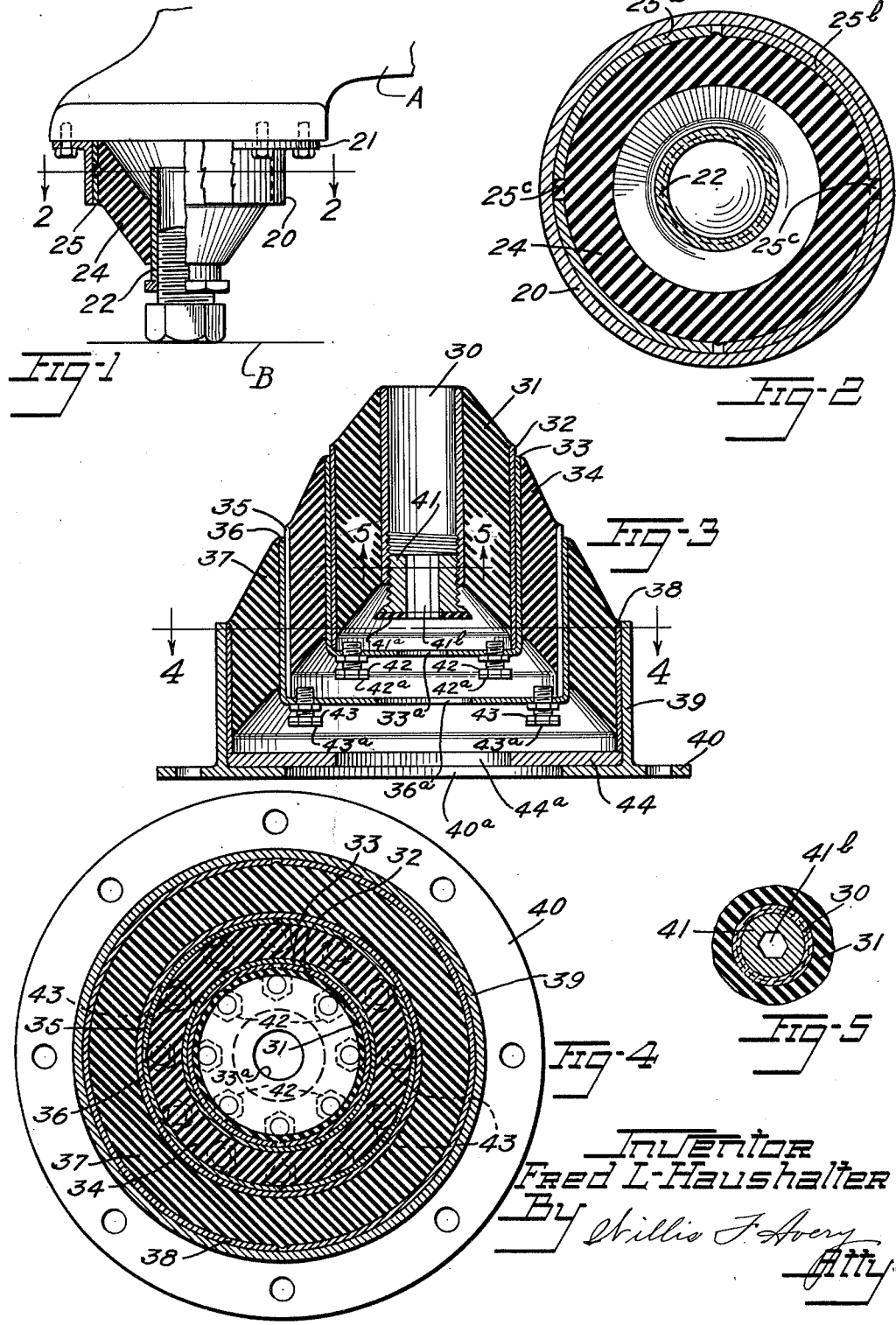

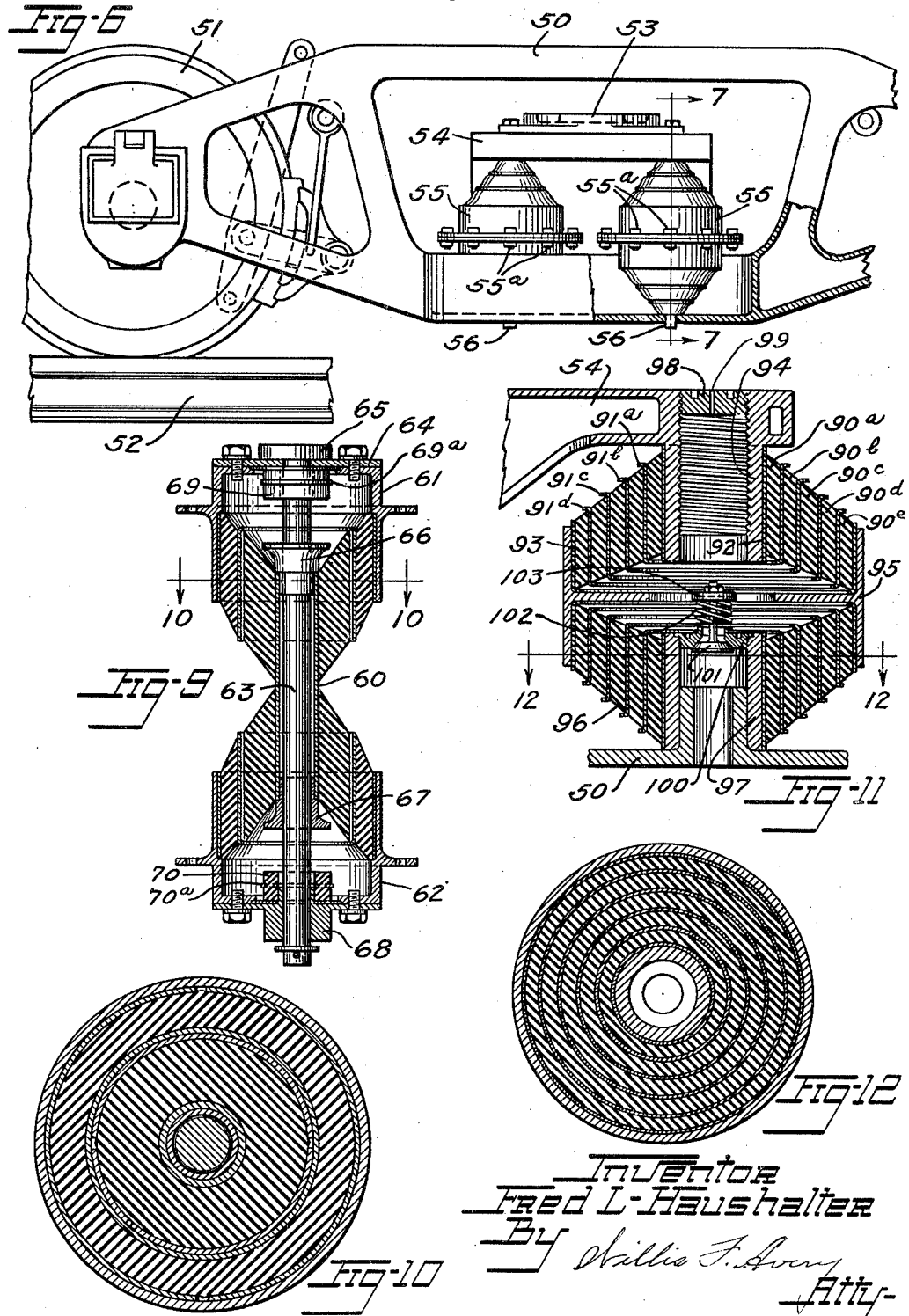

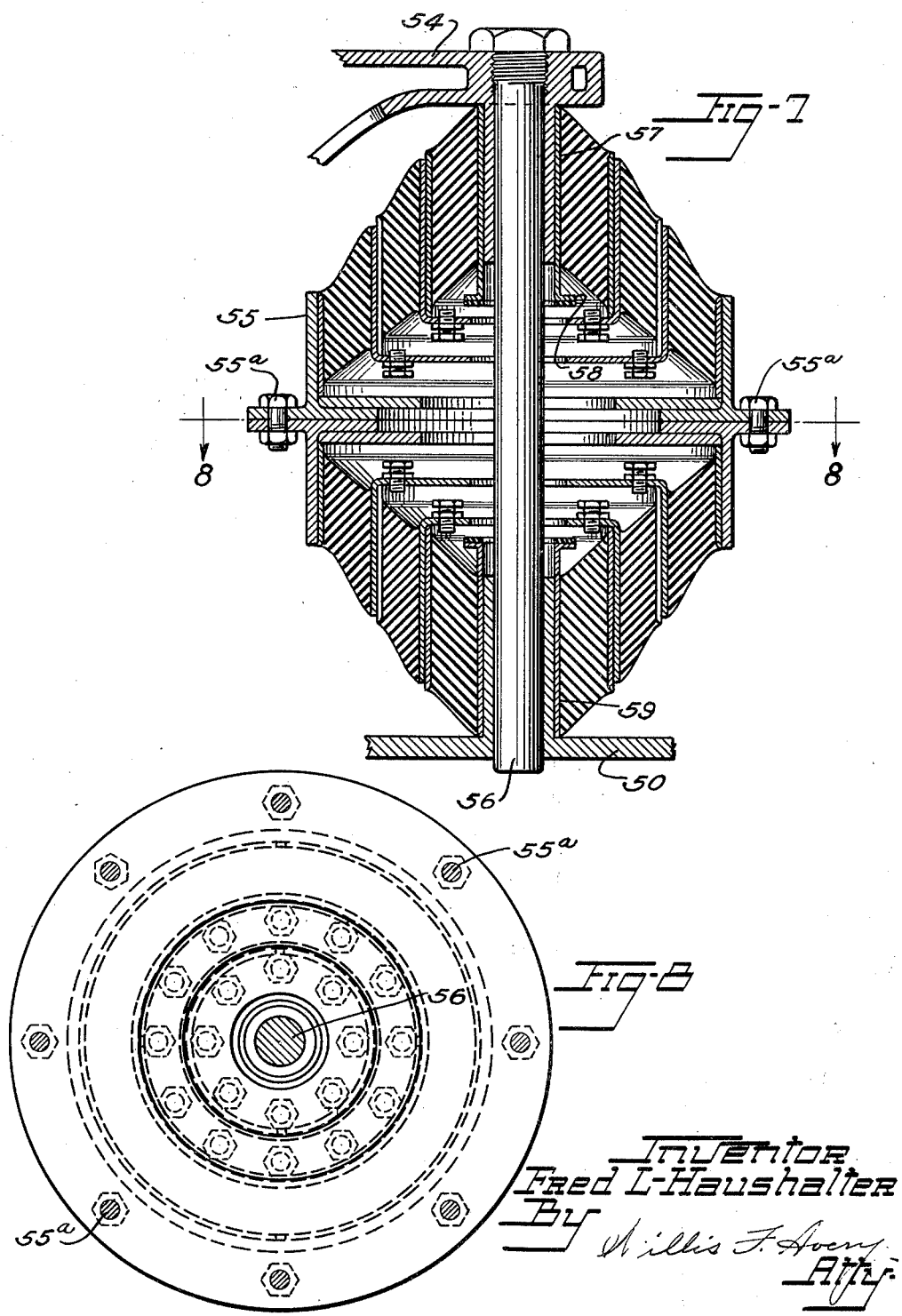

2,165,702

UNITED STATES PATENT OFFICE 2,165,702

RESILIENT MOUNTING

Fred L. Haushalter, Akron, Ohio, assignor to The B. F. Goodrich Company, New York, N. Y., a corporation of New York Application September 29, 1937, Serial No. 166,334

12 Claims. (Cl. 267—63)

This invention relates to resilient mountings and especially to spring structures for the support of rail cars and other vehicles and structures.

The chief objects of the invention are to provide a resilient mounting of improved construction, to provide a strong and stable mounting that has a large amplitude of deflection, to provide a conical rubber mounting of improved construction, to provide for operation of the mounting without interference by snow, ice or other foreign matter, to provide for limiting the movement of the mounting without interference by such foreign matter, to provide compactness of structure and strength, and to provide convenience of assembly and disassembly.

These and further objects will be apparent from the following description, reference being had to the accompanying drawings in which, Fig. 1 is an elevation, with parts sectioned and broken away, of a pedestal cushion constructed according to and embodying the invention.

Fig. 2 is a section taken along the line 2—2 of Fig. 1.

Fig. 3 is a vertical section of a modified construction embodying the invention.

Fig. 4 is a section taken along the line 4—4 of Fig. 3.

Fig. 5 is a section taken along the line 5—5 of Fig. 3.

Fig. 6 is an elevation, with parts sectioned and broken away, of a rail truck structure including springs or cushions constructed according to and embodying the invention.

Fig. 7 is a section taken along the line 7—7 of Fig. 6.

Fig. 8 is a section taken along the line 8—8 of Fig. 7.

Fig. 9 is a modified construction of a double conical mounting constructed according to and embodying the invention.

Fig. 10 is a section taken along the line 10, 10 of Fig. 9.

Fig. 11 is a further modified construction of a double conical mounting constructed according to and embodying the invention.

Fig. 12 is a section taken along the line 12, 12 of Fig. 11.

The invention is useful especially in the provision of springs in truck frames for railway cars, and the invention is useful also in the provision of resilient cushions for other structures as well, including stationary machinery and structures generally which are subjected to vibratory movement that it is desired to cushion, especially where a sturdy mounting is desired that provides a large amplitude of cushioned movement.

Referring to Fig. 1 which shows a mounting suitable for machinery, furniture, etc., the base or leg of a supported object is indicated at A, and the floor or other support is indicated at B. An annular member 20, provided with a flange 21 for attachment, is mounted at the under side of the base. A central or inner tubular member 22 provided with an internally threaded portion is adapted to receive a floor-contacting member 23 which may comprise simply a threaded bolt which can be adjusted as to height for the purpose of levelling the supported structure by its threaded engagement within the member 22. An annular cushioning body 24 of resilient rubber or rubber-like material encloses the inner member 22 and is adhered to it preferably by a vulcanized bond. At the radially outer portion of the cushioning body 24 is disposed an encircling sleeve 25 of circumferentially discontinuous construction which may be in the form of two sections 25ª and 25ᵇ approximately semi-circular, these sections preferably also being united to the rubber cushion 24 as by means of a vulcanized bond. The sections 25ª and 25ᵇ preferably are somewhat less than semi-circular so that they may be moved radially inward to compress the rubber cushion. If desired, the sections may be apertured as at 25ᶜ, 25ᶜ for receiving interlocking rubber to increase the strength of the attachment. The cushion 24 and discontinuous sleeve structure 25 are held within the annular enclosing member 20 preferably pressed radially inward so that the rubber will be under some radial compression and the sleeve structure 25 will be pressed against the enclosing member 20 and frictionally held within it.

The rubber body 24, preferably is concavo-convex providing an inner recess portion and an outer conical face and an axially offset relationship of the two portions that are attached to the inner member and the outer sleeve structure. This construction provides a large amplitude of deflection and upon descent of the supported structure the mounting is cushioned largely by shear stress of the rubber. Owing to the conical form of the cushion the radial pressure of the cushion against the enclosing members during deflection is increased by flattening of the cone and thus augments the bonding of the cushion to the members. This construction is compact, simple, durable, and is easily assembled and disassembled, and as the rubber cushion may be completely annular, the structure may be sealed air tight simply by sealing what small openings may exist around the cushion.

The embodiment of Figs. 3, 4 and 5 has similar advantages and is useful especially where larger amplitudes of deflection are desired while supporting heavy loads. In this embodiment an inner member 30, which may be of tubular form, has an enclosing annular body 31 of rubber or rubber-like material preferably secured to its outer surface by a vulcanized bond, and enclosing the rubber body is a discontinuous sleeve structure 32 which may be sectional as in the embodiment of Figs. 1 and 2, this sleeve structure preferably being attached to the rubber cushion 31 also by a vulcanized bond. This structure is nested within a plurality of enclosing resilient structures of generally similar construction although differing somewhat in detail. The second or intermediate structure comprises an inner member 33, preferably of metal in cup-like form and circumferentially continuous. A rubber cushion 34 encloses the member 33 and a circumferentially discontinuous sleeve structure 35 encloses the rubber cushion. The outer cushioning structure comprises an inner cup-like member 36 similar to the member 33, but larger, a rubber body 37 and an outer discontinuous sleeve structure 38. The nested cushioning structures are all bonded within an annular enclosing and attaching member 39 and flanged at 40 for attachment. Each cushioning structure is mounted within the next outer member in a state of radial compression of its discontinuous sleeve structure and rubber body upon the inner element of the structure. Each resilient structure is concavo-convex with the attached surfaces of the rubber cushion offset axially and the whole is assembled to provide a generally conical bushing with recessed portions provided by the concave faces of the cushions.

For the purpose of limiting the extent of axial movements of each of the cushioning structures so that the stress on each may be limited despite the dimensional differences, limiting stops are provided and arranged so that they may take effect progressively, or at the same time, as desired. To this end the innermost member 30 is provided with an adjustable stop element 41 which may be threadedly engaged within the inner member for adjustment and may be formed with a polygonal aperture 41ᵇ in which may be inserted a suitable tool to manipulate the stop member 41 for adjustment. The cup-like member 33 is provided with adjustable stops 42, 42, which may be in the form of screws threaded into the bottom of the cup member, and the cup member 36 of the outer resilient structure may be similarly provided with stops 43, 43 threaded into the bottom of this cup member. The arrangement is such that the stop member 41 of the innermost resilient structure is engageable with the member 33 of the next outer resilient structure and the stops 42 of this innermost resilient structure are engageable with the cup member 36 of the outermost resilient structure, the stop members 43 of the outermost resilient structure being engageable with a base plate 44 inserted within the annular enclosing structure 39. Owing to the differences in radius of the respective resilient structures the resistance to deflection will be least at the inner resilient structure and will be progressively greater radially outward. By adjusting the limiting stops properly the load on the inner resilient structure may be limited as desired and transferred to the outer structures progressively, or the stops may be adjusted so that deflection of all the structures will be limited concurrently. If desired, the faces of the limiting stops may be cushioned by rubber facings 41ᵃ, 42ᵃ, 43ᵃ, 43ᵃ. Facility of access to the limiting stops for their adjustment may be provided by apertures in the structure such as 33ᵃ in the bottom of the member 33, 36ᵃ in the bottom of the member 36, 44ᵃ in the member 44 and 40ᵃ in the member 40.

The plate 44 preferably extends throughout the internal diameter of the enclosing member 39 so that the discontinuous sleeve structure 38 of the outermost cushion rests upon it and the aperture 40ᵃ in the member 40 is preferably larger than the aperture 44ᵃ in the member 44 so that a surface of the plate 44 is exposed to facilitate disassembly of the bushing by simply pushing the plate 44 and the surmounted structure out of the annular member 39.

By this construction the limiting stops are all positioned within the concave portion of the mounting where they are housed and protected. Snow and ice and other foreign matter does not have access to the limiting stops where such foreign matter might objectionably affect the operation of these stops and the mounting is compact, sturdy and easily adjusted and assembled and disassembled. Thus it is well adapted for installations such as in railway truck frames and in some types of machinery where sturdiness and the little necessity for maintenance attention are desirable.

Referring now to the embodiment of Figs. 6, 7 and 8, the invention is illustrated as applied to the spring support of railway cars. In Fig. 6 a truck frame 50 carrying rail wheels 51 resting upon rails 52 carries a center plate 53 for supporting a car, the center plate 53 being supported upon a bolster 54 extending across the frame. The bolster 54 is supported by the truck frame through intervening resilient supports 55, 55.

The preferred construction of each resilient support is shown most clearly in Fig. 7. It comprises a pair of mountings, each of which may be of the construction of Fig. 3, mounted end to end in axial alignment, with their concave portions facing each other so that the adjustable limiting stops are housed within the cavity provided by the concave portions of the two mountings. The bases of the structures may be attached in abutting relation and held together by bolts 55ᵃ, 55ᵃ extending through their flanges. This provides a structure that is very stable laterally despite the large amplitude of cushioning movement that is possible in the axial direction, and if desired, the lateral stability may be augmented by the provision of a guide rod 56 extending through the center of both supports and fixed to the bolster, the rod being slidable through the frame to permit compression of the supports. Four or more of the supports 55 may be mounted in the truck frame to support a heavily loaded railway car. Inasmuch as the only outside surfaces of the support that are movable are sloping and relatively smooth the operation is not easily affected in an adverse manner by the accumulation of foreign matter in the truck frame.

The innermost element 57 of the upper cushioning assembly may be formed at its lower end with an outwardly projecting flange 58, faced with a rubber cushion if desired, for limiting the extent of axial movement of the innermost resilient structure, and the innermost sleeve 59 of the lower mounting unit may be similarly formed for a like purpose, as an alternative for the plug stop 41 of Fig. 3.

With reference to the embodiment of Figs. 9 and 10, the mounting units may be associated with their convex faces opposed rather than their concave faces although the latter construction is preferred as providing somewhat greater lateral stability. In cases where it is desired to mount the unit with convex faces in opposition the construction of Figs. 9 and 10 is well suited. Each unit may comprise a plurality of resilient structures as heretofore described, there being two such structures in each mounting of Fig. 9. A common inner-most member 60 may be provided and the outer-most members 61 of the top structure and 62 of the bottom structure may be of somewhat different construction to accommodate a central guiding member 63 for increasing the lateral stability of the assembly. The member 61 comprises a top plate 64 bolted to it, the plate 64 supporting the guide-rod 63 by means of a flanged portion or collar 65 on the rod. The guide rod 63 slides within collars 66 and 67 secured to the inner member 60 at its ends and the rod 63 slides also through a bushing 68 carried by the member 62. The guiding collars 66 and 67 serve also as stop members to limit the extent of axial movement of the mounting, these collars being adapted to contact abutments 69 and 70 which may be in the form of rubber cushions suitably reinforced against excessive lateral bulging as by means of rings 69ª, and 70ª embedded in the rubber and vulcanized to it. These rings may be apertured for through penetration by the rubber to provide a firm attachment. The members 61 and 62 may be suitably flanged as shown for attachment to the structures to be connected.

In each of the constructions above described the recess provided by the concave portion of the mounting may be sealed or substantially sealed to provide an air cushion to supplement the action of the resilient material in cushioning oscillations. In the embodiment of Figs. 11 and 12 the construction is such that the space within the mounting may be utilized for cushioned action by means of controlled air flow, the arrangement being such that upon descent of the load air is exhausted from the space, and upon a return movement the inflow of the air is restricted so that the spring characteristics will be different in the upward movement than on the downward movement. This embodiment may be used for examples as an alternative in the truck mounting of Fig. 6 between the bolster 54 and the truck frame 50. The resilient structure of this embodiment may comprise a series of annular bodies of rubber 90ª, 90ᵇ, 90ᶜ, 90ᵈ, and 90ᵉ with interposed annual metal sleeves 91ª, 91ᵇ, 91ᶜ, and 91ᵈ, to which the rubber bodies preferably are united as by a vulcanized bond. An innermost sleeve 92 and an outermost sleeve 93 also are united to the rubber assembly and the unit is interposed between an inner member 94 and an outer enclosing member 95. The latter is constructed to receive a lower mounting structure 96 of a construction similar to that of the upper mounting disposed between the outer member 95 and an inner member 97 positioned upon the truck frame member 50. The inner recess of the mounting provided by the concave faces of the resilient structure and by the hollow inner members is utilized as a space for an air cushion, the upper end being closed by a plug 98 which may have a small aperture 99 through it. The lower end of the recess is closed by a plug 100 having a value structure in it. The valve structure comprises a downwardly opened valve member 101 which is urged upward against the valve seat by a spring 102 contacting between the plug 100 and a disc 103 in the valve stem. The arrangement is such that upon descent of the load surplus air is forced out through the valve which then closes, and upon return movement of the load the resulting tendency to produce a vacuum resists such upward movement and provides greater stiffness on the return movement. The small aperture 99 in the plug 98 lets in air too slowly to prevent this action but nevertheless permits a slow inflow of air such as to restore the original condition of pressure within the mounting. The inner member 94 may be internally threaded throughout its length so that the plug 98 may be adjustably positioned for adjusting the volume of space within the cavity to vary the intensity of the snubbing action.

It will be understood that in any of the other mounting constructions hereinabove described the air spaces may be similarly utilized for supplemental air cushions if desired. In the embodiment of Fig. 3, for example, the small spaces provided between the sections of the discontinuous sleeve structures 32, 35 and 38 may serve as vents in the same manner as the aperture 99 in Fig. 11, but, if desired, all these spaces may be sealed as by plastic rubber or other suitable composition and a special vent provided, for example in the plug 41, which otherwise would be closed for this purpose. The closing of the bottom of the mounting and the provision of suitable valve mechanism will be understood from the description given above with reference to Fig. 11. These constructions are suitable also for the use of a liquid in the internal space of the bushing, which liquid will produce a shock absorber action by the loss of energy on passage of the liquid through the vent hole, a suitable reservoir being provided to receive the fluid for return to the space in the mounting.

Variations may be made without departing from the invention as it is hereinafter defined in the following claims.

I claim:

1. A resilient mounting comprising inner and outer members positioned for relative axial vertical movement, the outer member being circumferentially discontinuous, a continuously annular resilient cushion interposed between said members, and means holding the circumferentially discontinuous outer member and cushion pressed radially toward the inner member, the resilient cushion having faces sloping in the same general direction and the surfaces of the cushion at the inner and outer members being axially off-set to permit axial cushioned movement of one of the members with relation to the other.

2. A resilient mounting comprising inner and outer members positioned for relative axial vertical movement, the outer member being circumferentially discontinuous, a continuously annular resilient cushion interposed between said members, and means holding the circumferentially discontinuous outer member and cushion pressed radially toward the inner member, the resilient cushion having faces sloping in the same general direction and the surfaces of the cushion at the inner and outer members being axially off-set to permit axial cushioned movement of one of the members with relation to the other, and means for adjusting the effective axial length of the assembly.

3. A resilient mounting comprising inner and outer members positioned for relative axial movement, a continuously annular rubber cushion about the inner member, a discontinuous sleeve structure about the cushion, the sleeve structure and cushion being so mounted as to be normally held pressed toward the inner member within the outer member and the cushion being concavo-convex with its surfaces at the inner member and sleeve structure offset axially to permit axial cushioned movement of one of the members with relation to the other.

4. A resilient mounting comprising inner and outer members positioned for relative axial movement, a continuously annular rubber cushion about the inner member, a discontinuous sleeve structure about the cushion, the rubber cushion being vulcanized to the inner member and discontinuous sleeve structure, the sleeve structure and cushion being so mounted as to be normally held pressed toward the inner member within the outer member and the cushion being concavo-convex with its surfaces at the inner member and sleeve structure offset axially to permit axial cushioned movement of one of the members with relation to the other.

5. A resilient mounting comprising a plurality of concentrically arranged cushioning structures each comprising a circumferentially continuous inner member, a continuously annular rubber cushioning body, and a discontinuous sleeve structure enclosing said body, the innermost annular structure being held radially compressed within the annular structure outwardly adjacent thereto and means holding the outermost annular structure pressed radially inward.

6. A resilient mounting as defined in claim 5 in which the assembled annular structures present generally concavo-convex faces.

7. A resilient mounting comprising a pair of members, a structure comprising layers of resilient material separated by at least one sleeve mounted between said members for cushioned movement of one member with relation to the other, said structure having a recessed portion, and means disposed at least partly in the recess and including an element on said sleeve for limiting the extent of relative movement of the members.

8. A resilient mounting comprising inner and outer members, an annular structure comprising layers of resilient material separated by sleeves mounted between said members to permit cushioned axial movement of one member with relation to the other, the resilient structure having an end face thereof converging toward said inner member providing a recess, and means disposed at least partly in said recess and including elements on said sleeves for limiting the extent of relative axial movement of said members, at least one of said sleeves having a surface cooperable with an element of the next adjacent sleeve to limit the movement of the intervening layer of resilient material individually.

9. A resilient mounting comprising an inner member, a continuously annular body of resilient material mounted upon the inner member and having a face thereof converging toward the inner member providing a hollow portion, a sleeve member dividing said material into radially disposed sections and having a margin thereof disposed within said hollow portion, and means within said hollow portion in association with said margin for limiting the extent of relative movement of said members.

10. A resilient mounting comprising inner and outer members mounted for axial movement of one with relation to the other, a plurality of individually replaceable cushioned structures interposed therebetween, each having a rigid element associated with it and each comprising a rubber body, and means associated with said structures, and adapted to coact with said rigid elements to limit the extent of axial movement thereof.

11. A resilient mounting comprising inner and outer members mounted for axial movement of one with relation to the other, an annular cushioning structure interposed therebetween, the cushioning structure comprising a plurality of rubber bodies with interposed sleeve elements, and the rubber bodies having sloping end faces providing a concavo-convex form of the mounting, the concave surface thereof providing a concavity and means disposed in the concavity and carried by said sleeve elements adapted to coact with surfaces of the mounting for limiting the extent of axial movement of said members.

12. A resilient mounting comprising a pair of concavo-convex cushioning structures mounted end to end, each structure comprising a plurality of bodies of rubber arranged concentrically within enclosing sleeves and held pressed radially inward therein, and the structures being mounted with their concave portions adjacent each other, and means disposed internally of the mounting for guiding relative axial movement thereof and means also disposed internally of the mounting for limiting the extent of such movement.

FRED L. HAUSHALTER.